Jan. 3, 1950    H. B. JAYNES    2,493,350
LUBRICATION APPARATUS FOR ENGINES
Filed Jan. 9, 1947    3 Sheets-Sheet 1
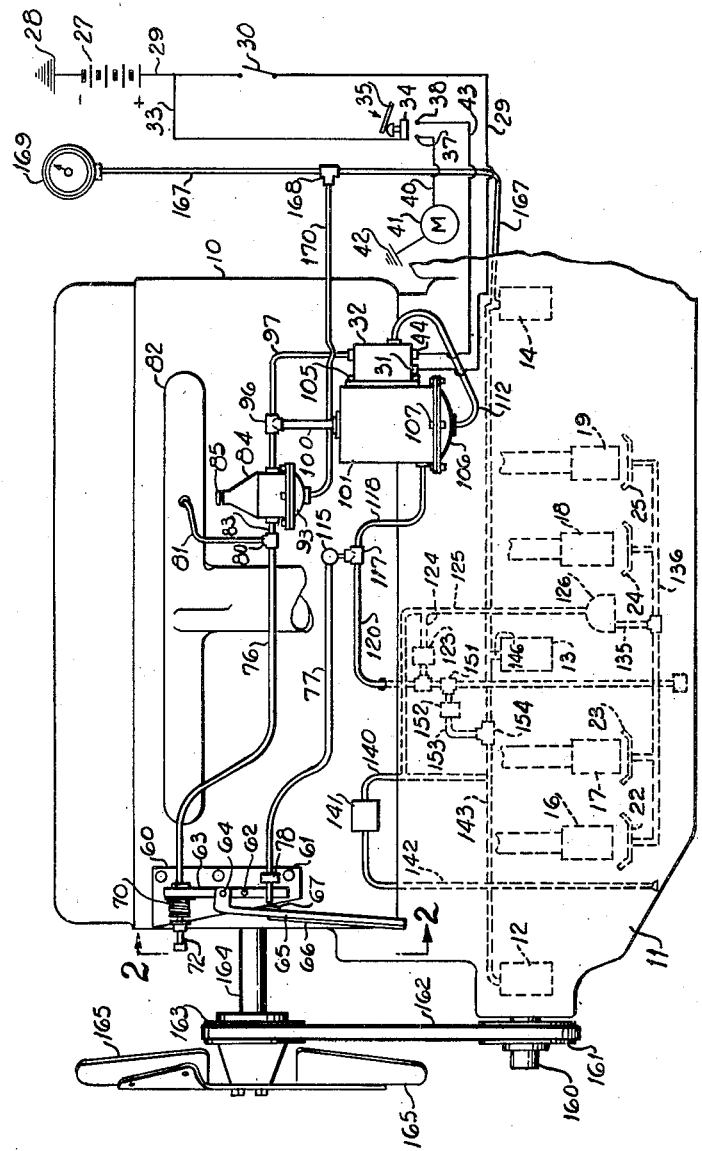
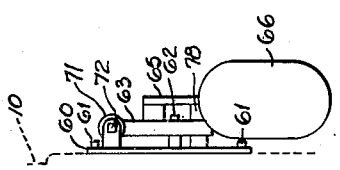
HAL B. JAYNES,
INVENTOR
BY
ATTORNEY

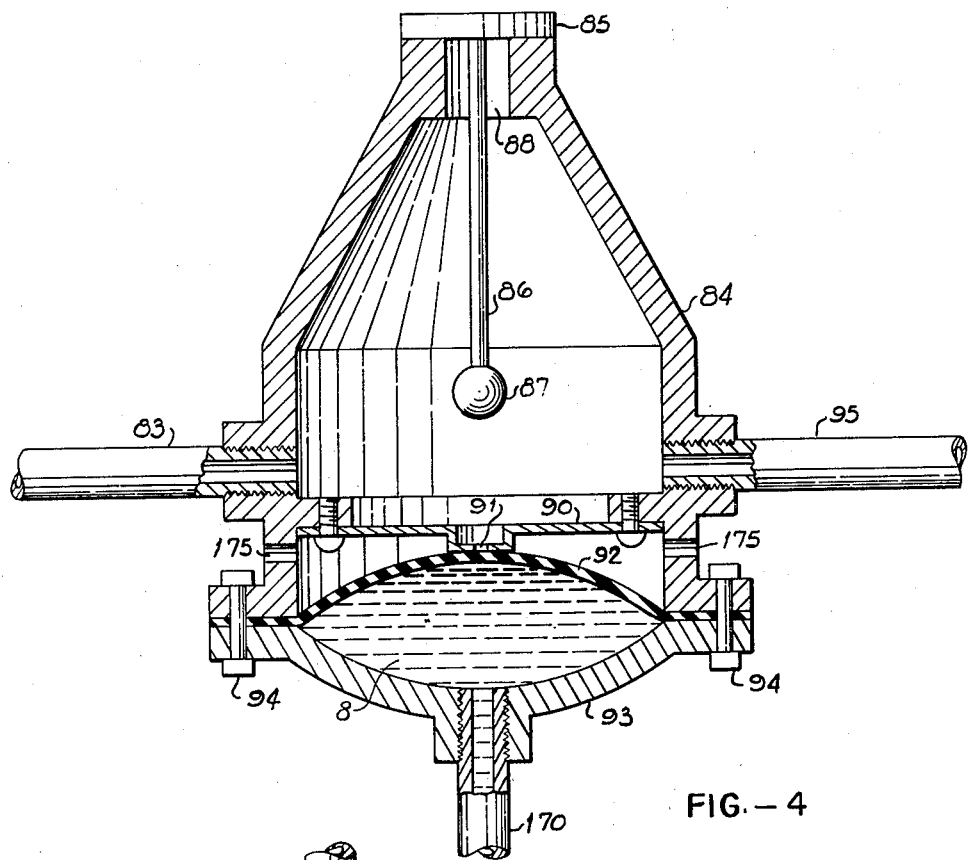
FIG.—4
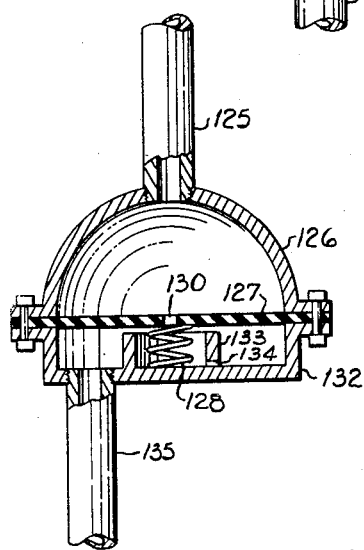
FIG.—5
HAL B. JAYNES,
Inventor.

Patented Jan. 3, 1950

2,493,350

UNITED STATES PATENT OFFICE 2,493,350

LUBRICATION APPARATUS FOR ENGINES

Hal B. Jaynes, Lenoir, N. C.

Application January 9, 1947, Serial No. 721,093

6 Claims. (Cl. 123—196)

This invention relates to apparatus adapted to be associated with an internal combustion engine for supplying proper lubricant to the crank shaft bearings and the connecting rod bearings when the usual operation of the engine under certain conditions will not supply this lubricant.

In the process of starting an internal combustion engine, when the starting motor switch is closed, it is a well-known fact that the proper amount of lubricant does not immediately go to the bearings of the engine until sufficient oil pressure has been built up by the oil pump. Also, it is quite evident that during a hard pull of an engine where it is overloaded, it is necessary for additional lubricant to be supplied to the bearings and to the crank case of the engine. Also, it is a well-known fact that in climbing long, steep grades, that sometimes the lubricant will all pass to one end of the crank case and the oil pump will not properly pump the required amount of lubricant to the various bearings of the engine, thus resulting in undue wear and, sometimes, failure.

It is, therefore, an object of this invention to provide means associated with an internal combustion engine to supply the proper amount of lubricant at all times to the various wearing parts of the engine.

Some of the objects of the invention having been stated, other objects will appear as the description proceeds when taken in connection with the accompanying drawings, in which Figure 1 is a side elevation of an internal combustion engine, and showing my invention applied thereto;

Figure 2 is an elevation taken from along the line 2—2 in Figure 1;

Figure 4 is an enlarged vertical sectional view of the uppermost central portion in Figure 3;

Figure 5 is an enlarged vertical sectional view of the lubricant retarding means shown in the lower central portion in Figure 3.

Figure 3:
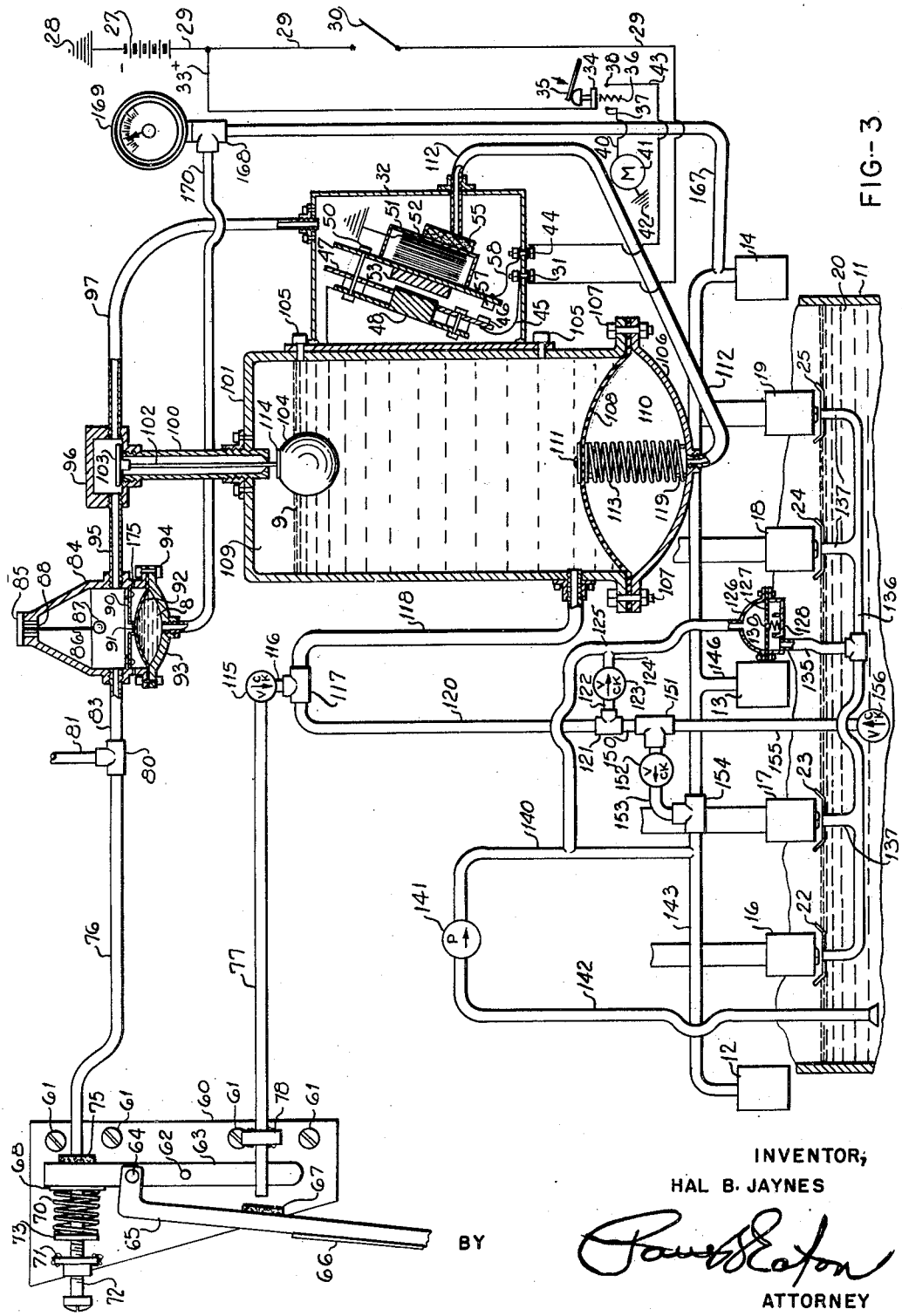
Figure 3 is a schematic view, partly in section, of the mechanism adapted to be associated with an internal combustion engine.

Referring more specifically to the drawings, the numeral 10 indicates an internal combustion engine having a crank case 11, in which is disposed a plurality of main bearings 12, 13 and 14, in which a crank shaft, not shown, is adapted to be mounted. The crank shaft has connected thereto the lower end or bearing portions of connecting rods 16, 17, 18 and 19. The crank case 11 is adapted to have the required quantity of oil 20 therein. Each connecting rod bearing has a scoop on the bottom thereof and a bore leading from the scoop to the crank on the crank shaft, dipping the lubricant from the crank case and forcing it to the connecting rod bearings.

I provide a plurality of cups 22, 23, 24 and 25, which are adapted to hold a quantity of oil, through which the lower end of the connecting rods travel for scooping oil from these pans 22 to 25, inclusive. The engine has associated therewith a suitable battery 27, grounded as at 28, having a wire 29, leading therefrom. This wire 29 leads to an ignition switch 30 and onto a contact screw 31, in an air-tight casing 32. The wire 29 has branching therefrom a wire 33 which leads to a starter switch button 34 adapted to be depressed by a suitable pedal 35. This starting switch 34 is a metallic conductor and is normally held in raised position by means of a compression spring 36. When depressed, it is adapted to engage contacts 37 and 38. From contact 37, a wire 40 leads to a starter motor 41 which is grounded as at 42. From contract 38, a wire 43 leads to another contact screw 44, penetrating the wall of housing 32. From contact 31, a wire 45 leads to a contact point 46 disposed on a fixed assembly 47 having integral therewith a soft iron core 48. Swingably mounted, as at 50, is an assembly 51 having a magnet coil 52 therein which has a soft iron core 53 projecting from the left-hand side thereof in Figure 3. Mounted on this assembly 51 is the resilient airtight washer 55, and the free end of assembly 51 has a contact 57 thereon in alinement with contact 46. A wire 58 connects contact screw 44 with contact 57.

Mounted on the front portion of the engine is a bracket 60 by any suitable means, such as screws 61, and this bracket has pivotally secured thereto, as at 62, a lever 63 which is pivoted thereto as at 64, downwardly extending arm 65 having a vane 66 thereon. The lever 65 has a resilient valve disk 67, such as rubber, mounted on its rear edge intermediate its end. The pivoted member 63 has a washer 68 on its upper front surface, adapted to be engaged by a compression spring 70, and welded to the bracket 60 is a lug 71 having a screw 72 threadably mounted therein and having a disk 73 adjustably mounted thereon and against which the other end of compression spring 70 rests.

The front surface of the upper portion of pivoted member 63 has a resilient valve or valve washer 75 secured thereon, which is held in engagement with the front end of a pipe 76 by means of the compression spring 70. The valve 67 is adapted to engage the front end of a pipe 77 fixedly mounted in a projecting portion 78 on bracket 60.

The pipe 76 has connected to the rear end thereof a T 80, to which is connected a pipe 81, which is connected to the intake manifold 82 of the internal combustion engine 10. Also connected to the T 80 is one end of a pipe 83, whose other end is connected to a casing 84, which has an opening 88 in its upper end normally closed by a valve 85 which has depending therefrom a rigid stem 86, having a weight 87 on its lower end. Near the lower end of housing 84 there is a partition 90 having a hole 91 centrally disposed therein. The lower portion of the housing 84 immediately below the partition 90 has perforations 175. To the lower end of housing 84 is fitted a flexible diaphragm 92 confined by a bottom member 93, being secured in position by bolts 94. Connected to the other side of the housing from the point of connection of pipe 83 is a pipe 95 which is connected to a T 96, and to the other end of the T 96 is connected a pipe 97, which has its other end connected to the top of housing 32. Also connected to the T 96 is a downwardly extending pipe 100 whose lower end is connected to and penetrates the top of an auxiliary oil tank 101. Mounted for up-and-down movement in pipe 100 is a stem 102 having a crosspiece 103 on its upper end to limit its downward movement. To the lower end of stem 102 is connected a float ball 104 which has a washer 114 on its upper surface adapted to engage and close the restricted lower end of pipe 100 when the liquid in tank 101 rises high enough to force the washer 114 against the lower end of pipe 100.

The housing 32 is secured to one side of the tank 101 by means of screws 105. To the lower end of tank 101 is secured a concavo-convex bottom 106 by means of bolts 107. Secured between the bottom 106 and the lower end of tank 101 is a flexible diaphragm 108, thus forming an air chamber 110 between the diaphragm 108 and the bottom 106, while the lubricant chamber thereabove is designated by 109. Secured to the lower surface of diaphragm 108, as by means of a screw 111, is a compression spring 113 whose lower end is supported by an annular projection 119 on the upper side of bottom 106. Communicating with the interior of annular projection 106 is a pipe 112 whose other end penetrates housing 32 and is adapted to be contacted by the washer 55.

The flexible resilient washer 55 on assembly 51 is adapted to rest by gravity on the open end of the pipe 112 which penetrates the wall of housing 32. The compression spring 113 normally tends to move the diaphragm 108 to the position shown in Figure 3.

The pipe 77 leads to a check valve 115, which has a pipe 116 extending downwardly therefrom and is connected to a T 117. On one side of T 117 a pipe 118 is led into the lower portion of the auxiliary oil tank 101. From the other side of the T 117 a pipe 120 is led downwardly to a T 121, which has leading therefrom a pipe 122 connected to one side of a check valve 123, and the other side of the check valve has a pipe 124, which is connected to a pipe 125.

The pipe 125 is connected at its lower end to a housing 126 which has a diaphragm 127 therein which is normally held in raised position by a compression spring 128. The diaphragm 127 has a hole 130 centrally disposed therein and the bottom 132 of the housing 126 has an annular well 133 so that when sufficient pressure is applied downwardly to the diaphragm 127, it will force it against the upper end of the annular well 133 and will prevent any oil flowing into the lower portion 132 of the housing 126. The annular well 133 has a hole 134 disposed in the bottom of its vertical wall to allow a normal supply of lubricant to pass into the lower portion of the housing 126 when the diaphragm 127 is forced against the upper end of the annular well 133.

From the lower portion of the bottom 132 is led a pipe 135 which connects to a pipe 136, and this pipe has rising upwardly therefrom a plurality of branch pipes 137, each of which is connected to the oil cups 22, 23, 24 and 25 associated with the connecting rod bearings 16 to 19, inclusive.

The pipe 125 is also connected to a pipe 140 which has a lubricant pump 141 disposed therein, and from the other side of lubricant pump 141, a suction pipe 142 is led into the lower portion of the crank case for supplying oil to the lubricant pump. The output pipe 140 of the lubricant pump 141 not only supplies oil to pipe 125, but also supplies oil to a pipe 143 which has its ends connected to crank shaft bearings 12 and 14, and has an intermediate branch pipe 146 connected to middle crank shaft bearing 13.

Leading from T 121 is a nipple 150 which is connected to a T 151, which has connected to one side thereof a check valve 152 which has an elbow pipe 153 leading therefrom to a T 154 in pipe 143. Leading downwardly from the lower portion of T 151 is a pipe 155 which has a check valve 156 in the lower end thereof submerged in the crank case oil which permits upward flow of oil in pipe 155 but prevents downward flow of oil through pipe 155. The crank shaft, which is not shown in Figure 3 for sake of clearness, is shown in Figure 1 and is indicated by reference character 160, and has mounted thereon a conventional V-pulley 161, on which is mounted a V-belt 162, which is connected to a V-pulley 163, mounted on a stub shaft 164, and this V-pulley 163 has integral therewith a plurality of fan blades 165. This fan, of course, rotates at all times the engine is running, and therefore, causes air pressure to be exerted against the vane 66 which is the key to the operation of this installation.

The oil pressure pump 141, as has previously been described, applies pressure through pipe 140 to the pipe 143 and the main bearings. Adjacent the rear end of this pipe 143 is connected a pipe 167 which extends to a T 168 which has connected to one side thereof an oil pressure gauge 169, and leading also from this T is a pipe 170 which is connected to the lower end or bottom portion 93 of the housing 84.

Method of operation

Let us assume that the parts are in the position as shown in the drawings when the engine is standing still except the diaphragms 92 and 108 are in a lowered position. Why the diaphragms 92 and 108 are in a lowered position when the engine is standing still will be later described. Let us assume that the operator closes the ignition switch 30 and depresses the starter switch 34. This will cause current to flow to both contact screws 31 and 44 and to contact points 46 and 57. Current will also flow through the magnetic coil 52 and will energize this coil and cause its core 53 to move against the soft iron block 48. During the initial starting procedure of the engine; that is, during the time that the starter motor 41 is turning the crank shaft 160 in the conventional manner, the manifold 82 will not create a vacuum in the pipelines 81, 83, 95 and 97 until the engine is started. There being no vacuum in the pipes 83 and 95, there will also be no vacuum in the housing 84 and, the diaphragm 92 being in its lowered position, as soon as the washer 55 moves away from the open end of the pipe 112 in the housing 32, air will pass through the ports 175, through the hole 91 in the partition 90, through the pipes 95 and 97 to the housing 32, and thus will enter the open end of the pipe 112 and will fill the chamber 110 and allow spring 113 to move upwardly to the position shown in Figure 3. This will raise the oil 9 in the auxiliary oil tank 101, as well as the oil in the pipe 118 to a point where it will pass over and through the pipe T 117 and thus downwardly, by gravity, through the pipe 120 and then through pipes 150, 153 and 143 to the main crank shaft bearings 12, 13, and 14. This oil will also flow through the pipe 122, the check valve 123, and pipe 125 into the housing 126 and the pressure of the lubricant as it falls through the pipe 125 onto the diaphragm 127 in the housing 126 will be sufficient to move the diaphragm downwardly against the annular well 133 and will thus permit a limited amount of oil to flow through the pipe 135 and pipe 136 to all of the oil cups 22 to 25 inclusive.

The hole 134 in the side wall of annular well 133 is smaller than the hole 130 in the diaphragm 127, but due to the pressure of the oil from the reservoir 109, the hole 134 will permit an approximately normal supply of oil to reach the cups 22 to 25.

The purpose of feeding lubricant to the main crank shaft bearings 12, 13 and 14 and to the cups 22, 23, 24, and 25 at the instant the starter switch 34 is closed, is to insure that the crank shaft bearings as well as the connecting rod bearings will have an ample supply of lubricant upon starting rotation which has heretofore not been possible, due to the fact that the oil pump 141 does not turn over with sufficient speed to generate any oil pressure at all during the initial starting procedure of the engine; that is, during the time that the starting motor 41 is transmitting rotation to the crank shaft 160.

When the engine is started and the starter switch is opened, since contacts 46 and 57 are in contact with each other, current will continue to flow through the coil 52 even though the starter switch is not allowing current to flow through the wire 43. This, of course, will hold the washer 55 away from the open end of the pipe 112 and simultaneously with the engine starting to run under its own power, the slip stream from the fan 165 will move the vane 66 rearwardly and cause washer 67 to close the front end of pipe 77 and thus prevent the air from entering through the pipe 77 and the check valve 115 and pipe 116 to the pipes 118 and 120. Now, assuming that the diaphragm 108, upon being urged upwardly by the spring 113 in the manner heretofore described, caused the oil to flow over and through the pipe T 117 at the juncture of the pipes 118 and 120, immediately upon the open end of pipe 77 being closed by the washer 67, the pipes 118 and 120, being filled with oil, will create a siphoning action on the lubricant 9 in the auxiliary oil tank 101 and, in this event although the level of the oil 9 in the tank 101 may be below the horizontal plane of the pipe T 117, the oil 9 in the tank 101 would be siphoned through the pipes 118 and 120 to the bearings 12, 13, and 14 and the cups 22, 23, 24 and 25. However, this siphoning effect in the pipes 118 and 120 works in both directions; that is, when the diaphragm 108 is moved downwardly, as will be presently described, the oil will be siphoned in the opposite direction, through the check valve 156, which is immersed in the oil 20 in the crank case 11 and through the pipes 120 and 118 back into the tank 101. The check valves 123 and 152 will prevent oil in the pipe lines 143 and 125 from being siphoned back into the pipes 120 and 118.

Immediately upon the engine having been started, obviously, the manifold 82 would create a vacuum in the pipe lines 81, 83, 95 and 97 as well as in the housing 32, thereby creating a vacuum in the pipe line 112 and thereby causing a vacuum in the chamber 110 and to thus lower the diaphragm 108. This will tend to withdraw the oil in the manner heretofore described as the diaphragm 108 is moved downwardly.

At this time the diaphragm 92 will have been forced upwardly to close the hole 91 in the partition 90 which will also prevent the ingress of air through the ports 175 to the housing 84 and this diaphragm 92 will be urged upwardly to this position by means to be presently described.

Now as the engine attains higher than cruising speed, and is not running under any heavy load, the R. P. M.'s will increase, of course, to the point where the vane 66 will be pushed further forwardly with the pivot of the lever 65 being on valve washer 67. This will exert a forward pull on the upper end of link 63 on its pivot 62, which will pull its washer 75 away from the front end of pipe 76. This will break the vacuum in the pipe 81 leading from the intake manifold 82 and in the meantime the oil pressure pump will be pumping oil through pipes 140, 125, casing 126, diaphragm 127, pipe 135 to oil cups 22 to 25, inclusive. Oil pressure will also be passing through pipes 140, 143, 167 and 170 to the lower portion 93 of housing 84 as indicated by reference character 8 and will push the diaphragm 92 up to the point to close the hole 91 in the partition 90. The vacuum will also be broken in the upper end of auxiliary tank 101, as well as in the air chamber 110 through pipes 97 and 112, and this will cause the auxiliary oil tank 101 to empty by siphoning through pipes 118 and 120. Inasmuch as the engine has been running higher than cruising speed as described in the preceding paragraph, the reservoir 109 is empty and the diaphragm 108 is at rest in the raised position shown in Figure 3. Prior to a hard pull, the oil supply must be replenished. Now as the engine R. P. M.'s decrease to normal cruising the vane 66 will move forwardly or to the left in Figure 3 to a position where the lever 65 will no longer be pivoted at the valve washer 67 but the valve washer 67 will continue to close the front end of pipe 77. The spring 70, having been adjusted to a predetermined pressure, will cause the valve washer 75 to close the end of pipe 76. During this time the oil pressure is normal, therefore, the diaphragm 92 in housing 84 will continue to close the hole 91 in the partition 90.

Since the ends of pipes 76 and 77 are closed and the engine has not been placed under a sufficiently hard pull to decrease the manifold pressure, the vacuum thus created will cause the diaphragm 108 to move downwardly and will create a vacuum in reservoir 109 and will siphon oil from the crank case 11 through check valve 156, pipes 155, 120 and 118 to auxiliary oil tank 101.

Now, if the motor is placed under a hard pull, there will be less vacuum in the intake manifold and thus the amount of vacuum in the chamber 110 will be decreased and the diaphragm 108 will raise upwardly and the oil from tank 101 will siphon through pipes 118, 120 and 143 to the main crank shaft bearings 12, 13 and 14. The limited vacuum caused by a hard pull also releases the float ball 104 thereby permitting the oil 9 in reservoir 109 to siphon by gravity through pipes 118, 120 and 143 to the main crank shaft bearings and through pipes 118, 120 and 125, through housing 126 as heretofore described, through pipes 135, 136 and 137 to cups 22 to 25, inclusive.

Now, if the engine is placed at an angle, such as climbing or descending a steep grade so that the oil is not evenly distributed throughout the crank case, the pendulum 87 will swing and unseat one side of valve 85 and will thereby break the vacuum in casing 84 which will likewise break the vacuum in the top of compartment 109 and in compartment 110 which will allow the oil in tank 101 to drain back to crank case bearings and as soon as the motor reaches approximately level ground, this vacuum in housing 84 will be restored, causing a depression of diaphragm 108 and the oil will be siphoned back through pipe 155 into the auxiliary tank 101.

Proper oil pressure from the oil pump 141 through a series of pipes, including pipe 170, to the space below diaphragm 92 will force the diaphragm 92 up against the opening 91 in partition 90 and will, therefore, prevent ingress of air through openings 175 in the lower portion of housing 84 and thus create a proper vacuum in the chamber 110 which will lower the diaphragm 108 and cause the oil in the crank case to be drawn back into the tank 101 through pipes 155, 120 and 118.

If there is a sudden drop in oil pressure due to a lack of oil 20 in the crank case 11, or for any other reason, and the R. P. M.'s are great enough to cause a normal vacuum as a result of manifold pressure but the R. P. M.'s are not such as to open the front end of the pipe 76, the oil 8 will return through pipes 170, 167, 143 and 140 to pump 141 and lower the diaphragm 92 thereby permitting ingress of air through ports 175 below partition 90 in housing 84 and through hole 91 in partition 90 to permit diaphragm 108 to rise upwardly and float ball 104 to release and the oil 9 in reservoir 109 will siphon through pipes 118 and 120 to main bearings 12 to 14 inclusive and to cups 22 to 25 inclusive.

While the engine 10 is idling there is usually sufficient oil pressure and manifold pressure to hold the diaphragm 108 in its lowered position, to hold the washer 114 on the upper surface of float ball 104 against the restricted lowered end of pipe 180 and to hold the diaphragm 92 in raised position against the hole 91 in partition 90. When the ignition switch 30 is opened, the engine 10 will no longer be in operation; therefore, the fan 165 will no longer cause a pressure against the vane 66 thereby allowing same to move forwardly which will open the front end of pipe 77. The open end of pipe 77 provides a break between the pipes 118 and 120 by admitting air to the check valve 115 and thus to the pipes 118 and 120 which will prevent the oil 9 in auxiliary tank 101 from siphoning into the bearings and pans and insure an ample supply of lubricant for again starting the motor.

When the ignition switch 30 is opened it will also stop the flow of current through wire 29, terminal 31, wire 45, contacts 46 and 57 through magnet coil 52 and will cause the resilient air tight washer 55 to drop against the open end of pipe 112 and prevent air from entering the chamber 110 in the bottom of auxiliary oil tank 101, thereby preventing diaphragm 108 from being moved upwardly by the spring 113 until the washer 55 is again caused to move away from the open end of pipe 112. Also, there no longer being a vacuum in the housing 84 when the engine 10 is not in operation, the oil pressure would drop and the oil 8 would flow through pipe 170 back into the bearings 12, 13, and 14. There being no vacuum in the housing 84, at this time, the diaphragm 92 will move to the lower position. It is thus seen how the diaphragms are in the lowered position as described in the beginning of "Method of operation."

In the drawings and specification there has been set forth a preferred embodiment of the invention, and although specific terms are employed, they are used in a generic and descriptive sense only, and not for purposes of limitation, the scope of the invention being defined in the claims.

I claim:

1. Lubrication apparatus for an internal combustion engine having main bearings for a crank shaft and connecting rod bearings adapted to be mounted on the crank shaft and an oil pan and cups through which the connecting rod bearings travel, said engine having an ignition circuit and an intake manifold and a driven fan for cooling the engine, an oil reservoir disposed at a higher level than the oil pan, a siphon pipe extending from the oil reservoir into the oil pan and having a check valve in the lower end thereof and an opening in the highest portion of the siphon pipe, a vane movable by the flow of air from the fan for closing the opening to allow oil to siphon from the reservoir into the oil pan, a diaphragm in the lower portion of the reservoir and spring means for normally moving the diaphragm upwardly to expel the oil in the reservoir through the siphon pipe into the oil pan, means connected to the intake manifold of the engine for creating a vacuum in the oil reservoir below the diaphragm for withdrawing oil from the oil pan in the reservoir, a pipe leading from the siphon pipe to all of the cups through which the connecting rod bearings travel, means operable by the force of the slipstream of the fan when the engine is cruising above normal cruising speed for breaking the vacuum below the diaphragm to allow the spring to raise the diaphragm to expel oil from the reservoir into the cups through which the connecting rod bearings travel, means operable by closing the ignition circuit for also breaking the vacuum below the diaphragm and allowing its spring to move the diaphragm upwardly to expel oil from the reservoir into the pans through which the connecting rod bearings travel, and means operable by the engine assuming a predetermined inclined position for breaking the vacuum in the top of the reservoir and also in the space below the diaphragm in the bottom thereof for allowing oil to be expelled from the reservoir into the pans through which the connecting rod bearings travel.

2. In an internal combustion engine having main crank shaft bearings and connecting rod bearings adapted to be disposed on the crank shaft and having an oil pan and a plurality of cups disposed in the oil pan through which the connecting rod bearings travel and having an ignition circuit, a pipe leading to all of the cups, said internal combustion engine having an intake manifold and a pipe leading therefrom, an oil reservoir disposed at a higher level than the oil pan and having a siphon pipe leading upwardly from the lower side thereof and then downwardly to the oil pan and having a check valve in the lower end thereof for allowing upward movement of oil in said pipe but preventing downward flow therethrough, said siphon pipe having a branch pipe connected to the oil cups, an oil pump having its intake side extending below the normal oil level in the oil pan and having its output side connected to the main crank shaft bearings and also connected to the pipe leading to the cups through which the connecting rods move, a diaphragm disposed in the bottom of the reservoir and spring means for normally urging the diaphragm upwardly to raise the level of oil therein to a point where it will siphon through the siphon pipe to the cups and to the main bearings, an intake pipe leading from the intake manifold to the bottom of the reservoir and below the diaphragm therein, valve means for opening said pipe upon completion of the ignition circuit, connections between the highest point of the siphon pipe and extending to a point adjacent the fan, a pivoted vane having a valve thereon so that the slipstream from the fan will move the valve to closed position to close the siphon pipe, means operable when a predetermined air velocity is generated by the fan for opening the vacuum line extending from the manifold to the bottom of the oil reservoir to break the vacuum therein to allow the diaphragm to move upwardly to expel the oil through the siphon pipe into the main bearings and the cups through which the connecting rod bearings move.

3. In an internal combustion engine having main crank shaft bearings and connecting rod bearings adapted to be disposed on the crank shaft and having an oil pan and a plurality of cups disposed in the oil pan through which the connecting rod bearings travel, a pipe leading to all of the cups, said internal combustion engine having an intake manifold and a pipe leading therefrom, an oil reservoir disposed at a higher level than the oil pan and having a siphon pipe leading upwardly from the lower side thereof and then downwardly to the oil pan and having a check valve in the lower end thereof for allowing upward movement of oil in said pipe but preventing downward flow therethrough, said siphon pipe having a branch pipe connected to the oil cups, an oil pump having its intake side extending below the normal oil level in the oil pan and having its output side connected to the main crank shaft bearings and also connected to the pipe leading to the cups through which the connecting rods move, a diaphragm disposed in the bottom of the reservoir and spring means for normally urging the diaphragm upwardly to raise the level of oil therein to a point where it will siphon through the siphon pipe to the cups and to the main bearings, an intake pipe leading from the intake manifold to the bottom of the reservoir and below the diaphragm therein, said intake pipe having an airtight housing disposed thereon, a diaphragm disposed in the bottom of the airtight housing, which, while the engine is operating is normally held in a raised position by pressure from the oil pump, the airtight housing having a partition disposed therein with a small hole in the bottom thereof against which the diaphragm is held, a pipe leading from the bottom of the airtight housing to the oil pump, means operable when the engine is running but only a limited amount of oil pressure is available, such as in a hard pull, whereby the diaphragm in the airtight housing will collapse relieving the vacuum in the line extending from the manifold to the bottom of the oil reservoir as well as in the line extending to the top of the oil reservoir to allow the diaphragm in the oil reservoir to extend upwardly to expel the oil through the siphon pipe into the main bearing and the cups through which the connecting rod bearings move.

4. In an internal combustion engine having an ignition circuit and having main crank shaft bearings and connecting rod bearings adapted to be disposed on the crank shaft and having an oil pan and a plurality of cups disposed in the oil pan through which the connecting rod bearings travel, a pipe leading to all of the cups, said internal combustion engine having an intake manifold and a pipe leading therefrom, an oil reservoir disposed at a higher level than the oil pan and having a siphon pipe leading upwardly from the lower side thereof and then downwardly to the oil pan and having a check valve in the lower end thereof for allowing upward movement of oil in said pipe but preventing downward flow therethrough, said oil reservoir having a pipe leading from the upper end thereof and its lower end being restricted, the last-named pipe having a vertically disposed, freely mounted, rod therein having a horizontally disposed T attached to its upper end beyond the limits of the pipe thereby restricting its downward movement, a float ball disposed on the lower end of the vertically disposed rod and disposed within the oil reservoir, the last-named vertically disposed pipe having a T fixed to its upper end, the T having branch pipes, one of which leads to the intake manifold and the second of which leads to the bottom of the reservoir, said oil reservoir having a diaphragm near its lower end, spring means for normally urging the diaphragm disposed in the bottom of the reservoir upwardly to raise the level of the oil therein to a point where it will siphon through the siphon pipe to the cups and to the main bearings, means for opening the second branch pipe upon completion of the ignition circuit, said engine having a cooling fan, a pipe connected to the highest point of the siphon pipe, and extending to a point adjacent the fan, a pivoted vane having a valve thereon so that the slipstream from the fan will move the valve against the open end of the last-named pipe to close the siphon pipe, means operable when a pre-determined air velocity is generated by the fan for breaking the vacuum in the branch pipes extending to the top and bottom of the oil reservoir thus permitting the float to move downwardly to break the vacuum within the top and bottom of the reservoir and expelling the oil from the reservoir through the siphon pipe into the main bearings and the cups through which the connecting rod bearings move.

5. In an internal combustion engine having a crank-shaft and main crank shaft bearings and connecting rod bearings adapted to be mounted on the crank shaft and having an oil pan and a plurality of cups disposed in the oil pan through which the connecting rod bearings travel, said engine having an intake manifold and a driven fan for cooling the engine and an oil pump, an oil reservoir disposed at a higher level than the oil pan, a diaphragm disposed in spaced relation to the bottom of the oil reservoir, a spring normally urging the diaphragm upwardly, a connection between the bottom of the oil reservoir and the intake manifold, a siphon pipe extending from the oil reservoir into the oil pan and having a check valve in the lower end thereof and having branch pipes, one branch pipe leading to the main bearings and the other branch pipe leading to the cups in the oil pan, said other branch pipe having a housing thereon through which the oil must pass before entering the oil cups, said housing being airtight and having a horizontally disposed diaphragm therein, said last-named diaphragm having a small hole in its center, a spring confined at its lower end by the bottom of the housing and having its upper end pressing against the last-named diaphragm, the housing having an annular wall projecting upwardly from its bottom to a point adjacent the last-named diaphragm and the annular wall having a hole in its lower side thereof smaller than the hole in the last-named diaphragm, means operable for breaking the vacuum within the reservoir and in the space below the first-named diaphragm and allowing oil to be expelled through the siphon pipes to the housing on the branch pipe leading from the siphon pipes wherein the extra weight or pressure of the oil from the reservoir tank will force the diaphragm confined therein downwardly against the annular wall against the upward pressure of the spring and permitting only enough oil to continue to the cups to provide normal lubrication by passing through the smaller hole in the lower side wall of the annular wall, and means operable by the normal operation of the engine for siphoning oil from the oil pan into the reservoir and allowing the last-named diaphragm to return to normal position to permit a normal supply of oil under pressure from the oil pump to course through the branch pipes and through the small hole in the center of the last-named diaphragm over the top edge of the annular wall and continue through the branch pipes to the oil cups in the crank case.

6. In an internal combustion engine having main bearings and connecting rod bearings and an intake manifold, an oil reservoir and an oil pan, means controlled by one speed of the engine for withdrawing oil from the oil pan into the reservoir, means controlled by another speed of the engine for expelling oil from the reservoir to the above-named bearings, means also operable by the tilting of the engine from its normal horizontal plane for expelling the oil from the reservoir to the bearings, and means also operable by still another speed of the engine for expelling the oil from the reservoir to the bearings.

HAL B. JAYNES.

REFERENCES CITED

The following references are of record in the file of this patent:

UNITED STATES PATENTS

| Number | Name | Date |
|---|---|---|
| 2,182,948 | Schojin | Dec. 12, 1939 |
| 2,273,888 | Paulsen | Feb. 24, 1942 |